No. 691,655. Patented Jan. 21, 1902.

T. F. McEVILLY.
WATER COOLER.
(Application filed July 20, 1901.)

(No Model.)

Witnesses

Inventor
Thomas F. McEvilly
By
Attorney

UNITED STATES PATENT OFFICE.

THOMAS F. McEVILLY, OF WILMINGTON, DELAWARE, ASSIGNOR OF ONE-HALF TO JOHN F. MALLOY, OF WILMINGTON, DELAWARE.

WATER-COOLER.

SPECIFICATION forming part of Letters Patent No. 691,655, dated January 21, 1902.

Application filed July 20, 1901. Serial No. 69,040. (No model.)

*To all whom it may concern:*

Be it known that I, THOMAS F. MCEVILLY, of Wilmington, in the county of Newcastle and State of Delaware, have invented certain new and useful Improvements in Water-Coolers; and I do hereby declare the following to be a full, clear, and exact description of the invention, such as will enable others skilled in the art to which it appertains to make and use the same.

This invention relates to improvements in water-coolers.

The object is to provide simple and highly efficient filtering means capable of being inserted in any ordinary ice-cooler, to the end that not only the water placed within the cooler, but that coming from the ice itself, will be thoroughly filtered before it is drawn off.

The invention will be hereinafter fully set forth, and particularly pointed out in the claims.

Figure 1:
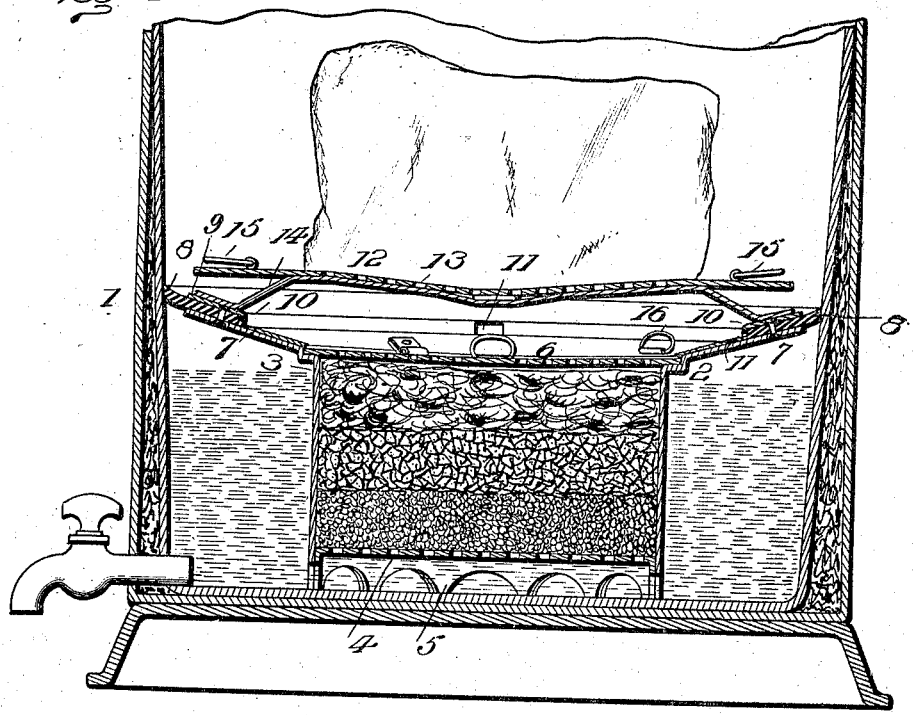
Figure 2:
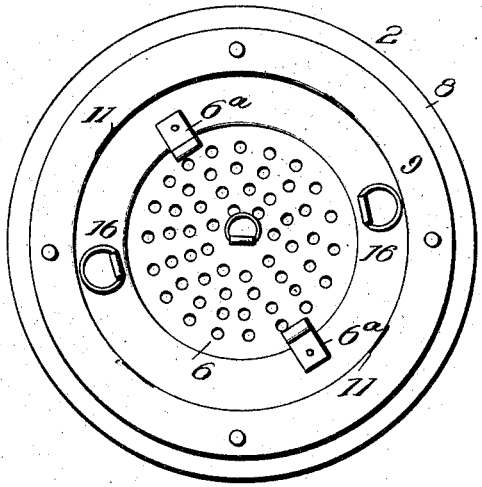
Figure 3:
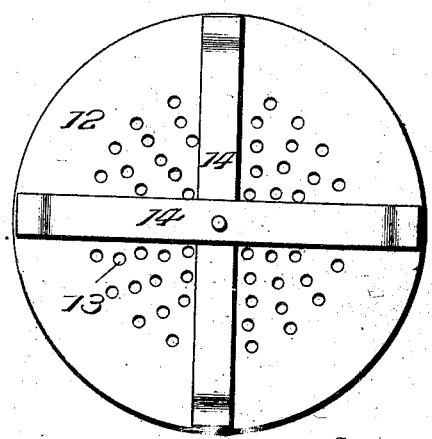

In the accompanying drawings, Figure 1 is a vertical sectional view showing a water-cooler equipped with my improvement. Fig. 2 is a plan view of the filter. Fig. 3 is an inverted view of the ice-rest.

Referring to the drawings, 1 designates the water-holding compartment of an ordinary ice-cooler, and 2 the filter in its entirety, the chamber 3 of which is shown as of cylindrical formation; but it is obvious that this may be square or of any other desired shape. The chamber 3 has a foraminous bottom 4 and supporting-legs 5, which rest on the bottom of the cooler. Within the chamber is placed the filtering-bed, of any preferred composition, that shown consisting of layers of gravel and charcoal and a top sponge, the latter being retained by a foraminous cover 6, fitted over the top of chamber 3 and removably held by any suitable means, that shown consisting of two buttons 6ª; but it is obvious that the cover may be secured by being screwed into the chamber.

From the upper end of the filter-chamber extends an upwardly-flared flange 7, which entirely surrounds the chamber and to which is secured a gasket 8, of rubber or other suitable material, the edge of the gasket projecting considerably beyond the edge of the flange. By this construction the flange is materially strengthened, and any weight sufficient to bend it downward will bring its outer edge nearer to the wall of the cooler, thus causing the gasket to more firmly fit against such wall and prevent the passage of water at that point. To additionally strengthen the gasket and hold the same in place, a plate 9 of substantially the same diameter as flange 7 is placed on top of the gasket and secured to the latter and the flange. The plate 9 is formed with a flange 10, against which fits the inner edge of the gasket and wherein are formed openings 11 to allow of the passage of any water that may get in between the gasket and the top plate.

12 designates the ice-holder, the same consisting of a circular plate slightly depressed toward its center and formed with perforations 13 for the passage of water, while to the under side of the plate are secured two bowed springs 14, the ends of which rest on plate 9, such springs tending to take the weight of the ice and prevent injury by the falling thereof. The ice-holder is equipped with two rings 15, by which the same may be readily removed, and for the same purpose two rings 16 are secured to plate 9 to permit of the ready removal of the filter from the cooler.
In practice the filter is placed within the cooler, with the gasket binding tightly against the wall of the chamber thereof. The ice-holder being in position, ice may be placed thereon and water may be supplied to the cooler. The water will pass through the ice-holder, or it may be around the edge thereof, and being directed toward the cover 6 will pass through the perforations therein, and downwardly through the filtering-bed, and finally out through the spaces between the supporting-legs 5 into the space surrounding the filtering-chamber, when it may be readily drawn off for drinking purposes.

The advantages of my invention are apparent. In the first place, by the employment of a filter within the ice-cooler for filtering the water of the ice, as well as the water to be cooled, perfect filtration is had and the danger consequent from the use of filtered water containing unfiltered ice is avoided. Furthermore, although the water will be cool when drawn off it will not be cold to the extent that has been found to be detrimental. It will also be noted that the filter may be readily removed from the cooler and that the filtering-bed may be cleansed either by running water through it in a reverse direction or by boiling the parts composing the bed. It is obvious that my improvement may be employed with almost every form of water-cooler now in use without requiring any change of construction in the coolers.

Another point of advantage is that the springs 14, resting upon the inclined plates 9, will upon a heavy piece of ice being dropped on the holder have sufficient play to withstand the shock without breaking, yet will not come in contact with or cause injury to the wall of the cooler.

I claim as my invention—

1. The combination with a water-cooler and a filter removably located therein, comprising a central chamber having an upper inlet and lower outlet, and forming between itself and the cooler a surrounding water-chamber, such filter having an upwardly-flared flange, and a gasket for bearing against the wall of the cooler, of an ice-holder located above the filter consisting of a foraminous plate, and springs secured to the under side of such plate having free ends forming legs or supports resting upon the filter, said foraminous plate being supported above the upper openings of the filter, substantially as set forth.

2. The combination with a water-cooler, of a filter removably located therein forming a surrounding water-space between itself and the body of the cooler, a foraminous cover for the filter, an upwardly-flared flange extending from the filter around the cover, a gasket secured to such flange for forming a water-tight engagement with the body of the cooler, a plate on said gasket, a spring-held ice-holder mounted on said plate and above the cover of the filter and having central perforations, the inlet to the filter being at the top thereof and the outlet at its bottom, such outlet opening into the surrounding water-space, as set forth.

3. The combination with a water-cooler, of a filter removably located therein forming a surrounding water-space between itself and the body of the cooler, a foraminous cover for the filter, an upwardly-flared flange extending from the filter at or near the top thereof, a gasket secured to such flange for forming a water-tight engagement with the body of the cooler, a plate on said gasket having a flanged portion formed with openings, for the purpose stated, and an ice-holder above the filter, the inlet to the latter being at the top, and the outlet at the bottom, such outlet opening into the surrounding water-space, as set forth.

In testimony whereof I have signed this specification in the presence of two subscribing witnesses.

THOMAS F. McEVILLY.

Witnesses:
 FRANCIS J. BYRNE,
 WM. J. BYRNE